Oct. 10, 1967  A. O. BALLY  3,346,121
FILTER AND METHOD FOR ITS PRODUCTION
Filed Aug. 13, 1965  5 Sheets-Sheet 1

INVENTOR.
Alexander O. Bally
BY
William D. Fosdick
AGENT

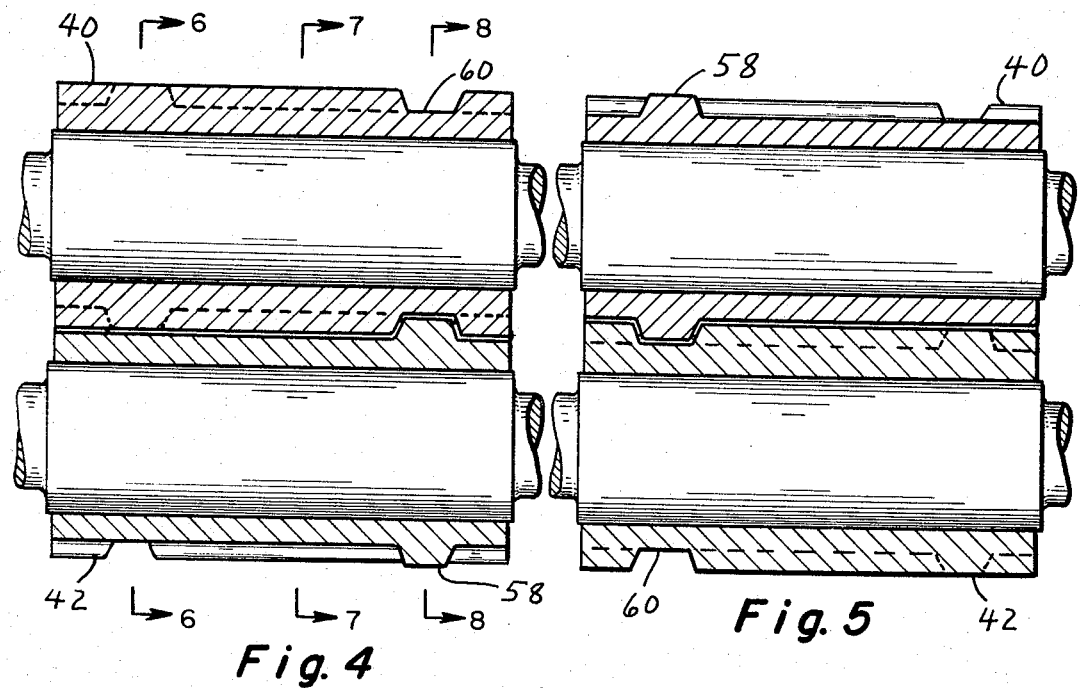
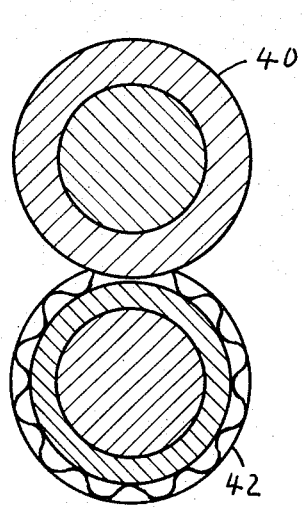 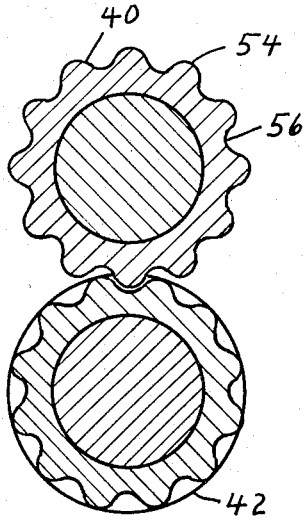 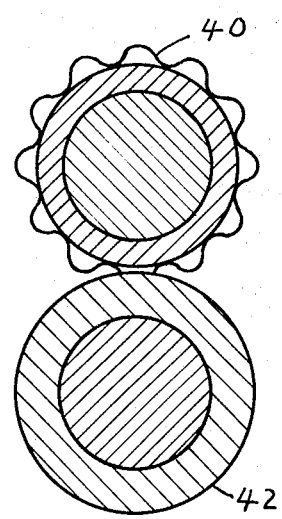
Fig. 4    Fig. 5
Fig. 6    Fig. 7    Fig. 8

United States Patent Office 3,346,121
Patented Oct. 10, 1967

3,346,121
FILTER AND METHOD FOR ITS PRODUCTION
Alexander O. Bally, Corning, N.Y., assignor to Corning Glass Works, Corning, N.Y., a corporation of New York
Filed Aug. 13, 1965, Ser. No. 479,561
5 Claims. (Cl. 210—493)

This invention relates to improved structures for use in filtering liquids and gases and to improved methods for the production of such structures.

In United States Patent 3,112,184, to R. Z. Hollenbach, there is described a method for producing light-weight ceramic honeycomb structures useful, for example, as heat exchangers. The Hollenbach process involves depositing pulverized ceramic materials and a binder on a flexible carrier, corrugating the carrier, forming an article of a desired shape from such corrugated carrier, and thereafter firing the article to sinter the ceramic particles to produce a unitary structure which may have walls of controlled porosity, which structures includes a plurality of continuous channels extending between opposed surfaces of the structure.

It is an object of the present invention to modify the process of Hollenbach in order to render the process suitable for the production of filters.

It is a further object of the present invention to provide a general method for the production of filters from formable thin filter materials.

A further object of the invention is the production of a strong, light-weight filter having the ability to withstand high temperatures and the action of corrosive fluids.

These and other objects, which will be apparent from the detailed description of the invention, are accomplished by shaping a formable filter material by passing the material between forming rollers having corrugated intermeshing surface portions with particular configurations hereinafter described and subsequently forming a filter structure comprising alternate layers of a spacer material and the formed filter material.

Figure 1:
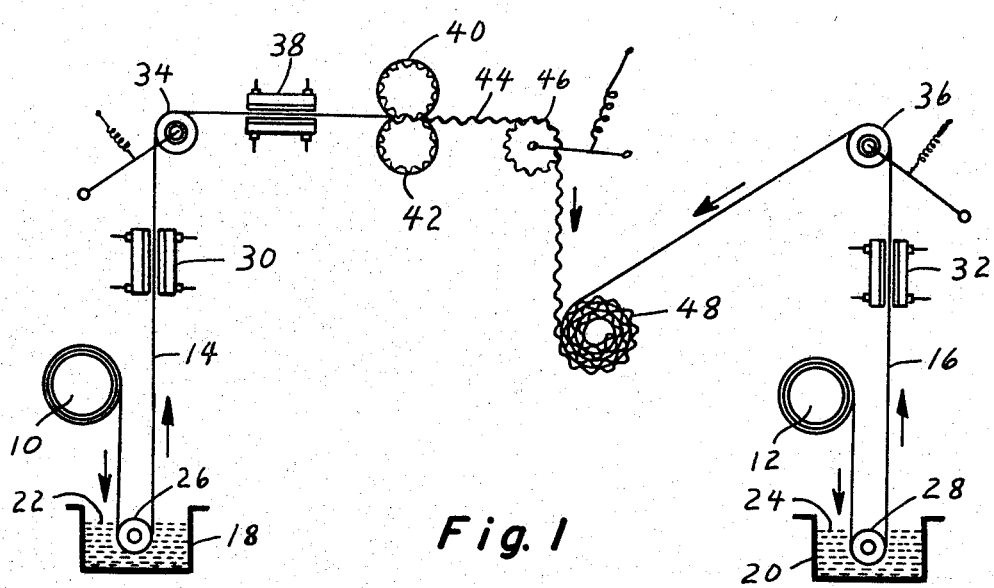
Figure 2:
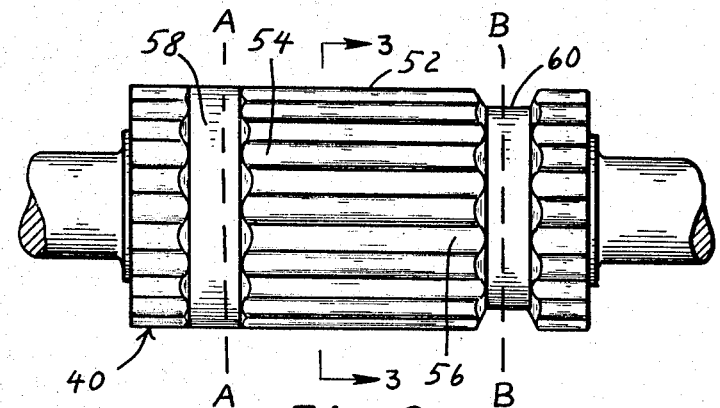
Figure 3:
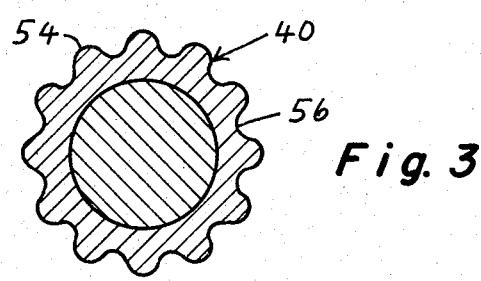
Figure 9:
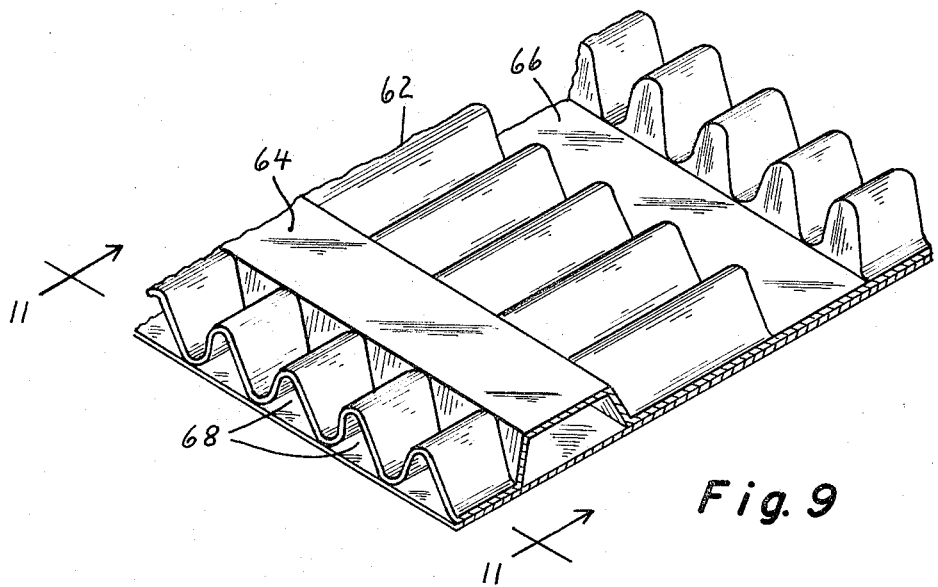
Figure 10:
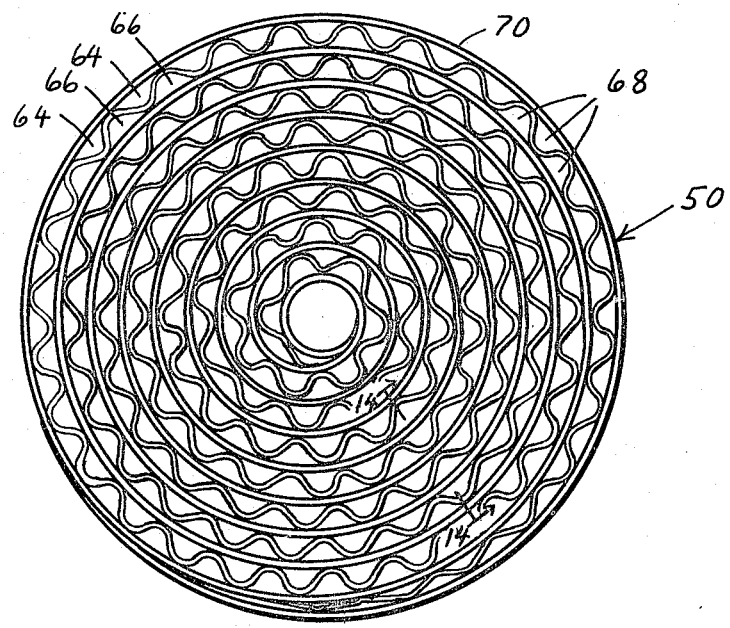
Figure 11:
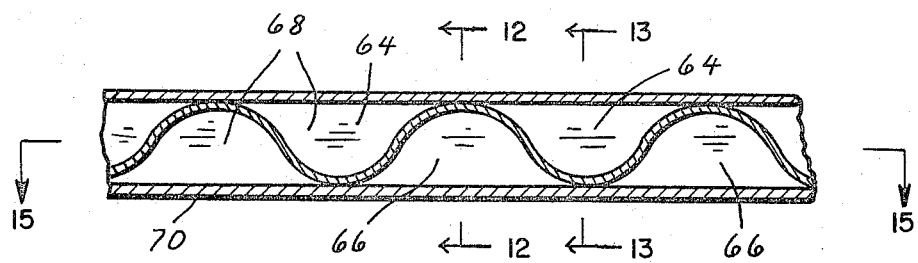
Figure 12:
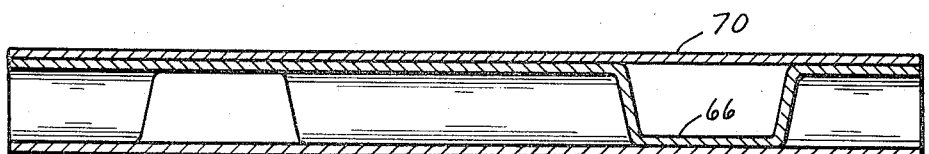
Figure 13:
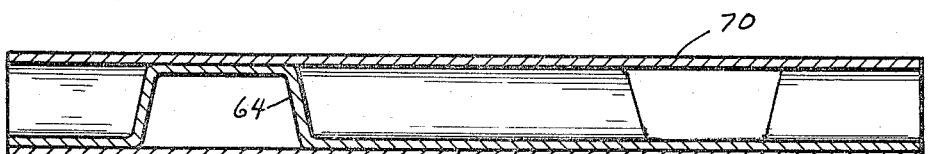
Figure 14:
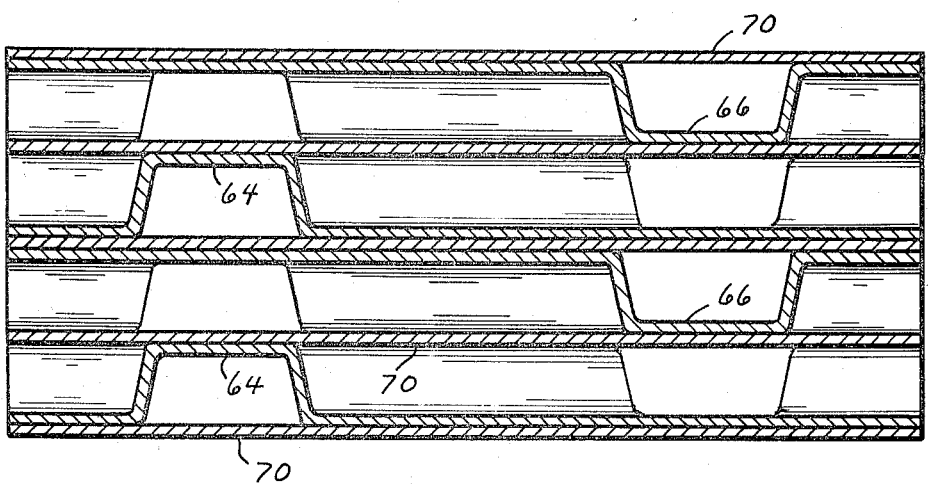
Figure 15:
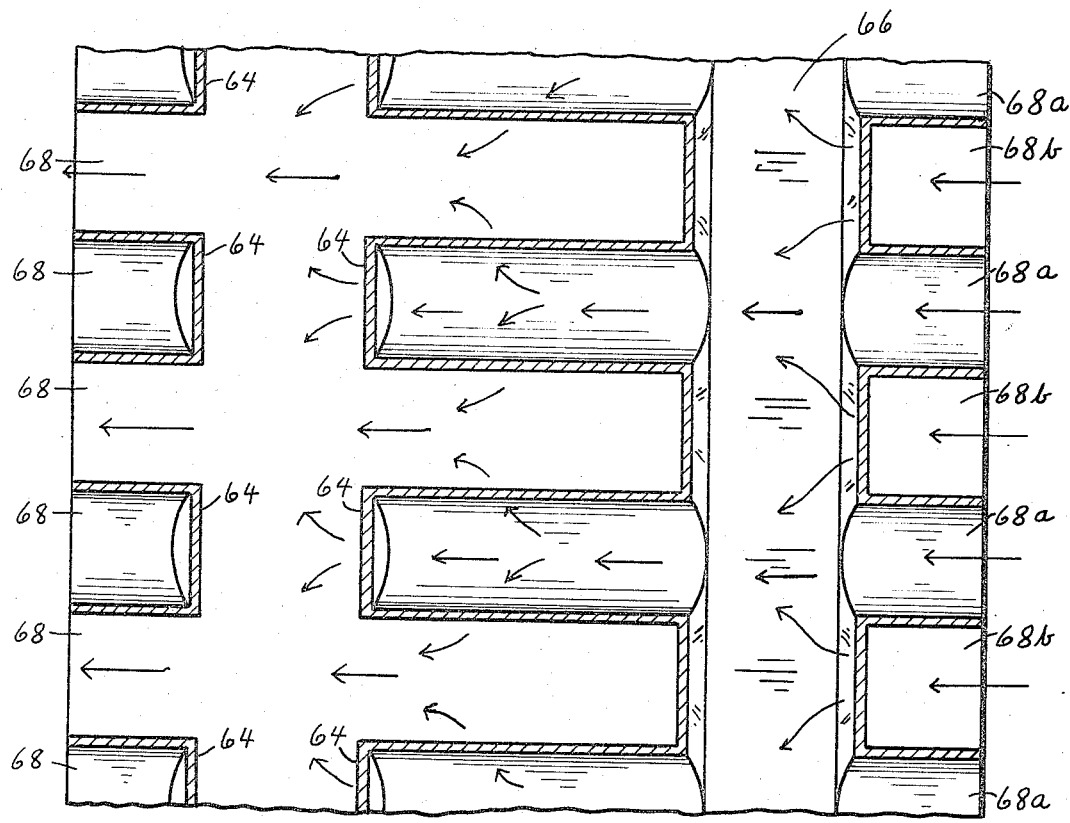

The invention will be described with reference to the accompanying drawing, in which:

FIG. 1 is a schematic representation of the apparatus used in the invention,

FIGURE 2 is a side elevational view of one of the forming rollers utilized in the invention, FIGURE 3 is a sectional view taken on line 3—3 of FIGURE 2, FIGURE 4 is an axial sectional view taken through the two intermeshing rollers of FIGURE 1, FIGURE 5 is a view similar to that of FIGURE 4, with the rollers rotated slightly, FIGURE 6 is a sectional view taken on line 6—6 of FIGURE 4, FIGURE 7 is a sectional view taken on line 7—7 of FIGURE 4, FIGURE 8 is a sectional view taken on line 8—8 of FIGURE 4, FIGURE 9 is a perspective view of a segment of formed filter material bonded to a single sheet of spacer material, FIGURE 10 is a top plan view of a spirally wound filter structure according to the invention, FIGURE 11 is an end view of the filter material of FIGURE 9, taken on line 11—11 of FIGURE 9, with the addition of a second layer of spacer material, FIGURE 12 is a sectional view taken on line 12—12 of FIGURE 11, FIGURE 13 is a sectional view taken on line 13—13 of FIGURE 11, FIGURE 14 is a sectional view taken on line 14—14 of FIGURE 10, and FIGURE 15 is a sectional view taken on line 15—15 of FIGURE 11, rotated clockwise by 90°, with the addition of arrows illustrating the direction of flow of a fluid through the filter material.

Referring to FIGURE 1, reels 10 and 12 contain suitable carrier materials 14 and 16, which materials may be, for example, porous natural cellulose paper, commonly referred to as 3½ pound teabag paper. The carrier materials are drawn through vessels 18 and 20, containing suspensions 22 and 24, which suspensions comprise a finely divided sinterable inorganic ceramic material, a binder and a solvent for such binder. The sinterable ceramic material may consist of 95 parts by weight of a petalite and 5 parts by weight of talc ($3MgO \cdot 4SiO_2 \cdot H_2O$) ground to a particle size of $-200$ mesh. The solution may consist of 45 grams of epoxy resin "Hysol 6111", 2.61 grams of hardener F-1 and 90 cc. of solvent consisting of a mixture of toluene and butyl alcohol. "Hysol 6111" is an epoxy hydroxy polyether resin sold by Houghton Laboratories, Inc. "F-1" is the trade name applied to the particular hardener for curing "Hysol 6111" and consists of a mixture of primary and secondary amines. Inasmuch as the various constituents of the suspension are described in detail in the above-mentioned Hollenbach patent, the disclosure of which is hereby incorporated by reference into the present specification, further detail regarding such constituents will be omitted here. Idler rollers 26 and 28 insure that the carrier is completely immersed in the suspension. The coated carriers pass through heating chambers 30 and 32. The partially dried carrier materials with their coatings of inorganic materials and binder subsequently pass over tensioning rollers 34 and 36. Carrier 14 subsequently passes through a second heating chamber 38 and between crimping rollers 40 and 42, where the coated carrier is formed into the crimped filter material 44 utilized in the filter structure of the invention. The crimped filter material passes over the second tensioning roller 46, and the crimped material and the smooth spacer material are spirally wound in alternate layers over take-up roller 48. Due to the fact that the smooth spacer strip 16 has passed through only one heating chamber, the ceramic suspension is still in a tacky condition and holds the alternate crimped and smooth layers together when the wound body is removed from the take-up reel. The body is then removed from the reel and placed in a furnace and heated at the rate of about 25° C. per hour to 400° C. and held at this temperature for about 1 hour. Further heating is then effected up to 1200° C. at a rate of about 100° C. per hour and then to 1250° C. at about 25° C. per hour, and the body is then held at 1250° C. for about 4 hours. The body is then cooled to about 100° C. in 16 hours and removed from the furnace. The result is the sintered unitary structure 50 illustrated in FIGURE 10.

The filter material is crimped into its characteristic form by rollers 40 and 42. As illustrated in FIGURES 2-8, rollers 40 and 42 are identical to one another, and each roller comprises a surface, such as surface 52 of roller 40 of FIGURE 2, which comprises a plurality of longitudinal corrugations comprising adjacent ridges 54 and grooves 56. Near one end of each roller the grooves are filled in, resulting in a cylindrical roller portion 58 having a radius equal to the radius of the corrugated roller surface at the peaks of ridges 54. Near the remaining end of the roller a second cylindrical roller portion is formed by cutting away ridges 54 to form a cylindrical surface 60 having a radius equal to the radius of the corrugated portion of the roller surface at the bases of the grooves.

As is illustated in FIGURES 4-8, the corrugated surfaces of rollers 40 and 42 intermesh, thereby producing a basically corrugated filter material, such as corrugated filter sheet 62 of FIGURE 9. As illustrated in FIGURES 4 and 5, the rollers are oriented with respect to one another such that the larger cylindrical portion 58 of one roller is opposed to the smaller cylindrical portion 60 of the other roller. Consequently, the formed filter sheet 62 contains flat uncorrugated areas near each end thereof, one flat area 64 being at a location corresponding to the peaks of the corrugation ridges, and the other flat area 66 being in a location corresponding to the lowermost points of the grooves of the corrugations. Thus, when porous sheet 62 is sandwiched between two flat sheets, which may be either porous or non-porous, channels 68 are alternately blocked by portions 64 and 66 near alternate ends of the channels.

The effect of the blocking of alternate ends of channels 68 by means of portions 64 and 66 is illustrated in FIGURE 15, wherein the arrows illustrate the paths of a fluid through the filter. The fluid enters each of channels 68 from the righthand side of FIGURE 15. Fluid passing into the channels designated as 68a freely passes the lower indented portion 66 and continues until it reaches the raised portion 64. At this point it can travel no further without passing through the walls of the porous filter material, thereby causing particles to be filtered out of the fluid. Similarly, fluid entering the channels designated as 68b travels without obstruction only as far as indented portion 66, at which time it must pass through the filter material. Thus, all liquid passing through the filter must pass through the walls of the filter material at least once. As can be seen from examination of FIGURE 15, it is not necessary for the fluid to pass through the flat spacer sheet, and, accordingly, the flat sheet may be either impervious or pervious to the fluid being filtered.

Although, according to a preferred embodiment of the invention, the corrugated sheet is made of a porous material, such is not essential if the flat spacer sheet is porous. It is sufficient for the practice of the invention that at least one of the types of sheet be porous. For the most rapid filtering action it is preferable that both the flat sheet and the corrugated sheet be formed of porous materials.

The indentations in rollers 40 and 42 have been placed not at the extreme ends thereof, but rather at locations spaced from the ends by small distances. The purpose of such arrangement is to provide increased structural strength in the filter body produced thereby. Due to the fact that indented portions 64 and 66 of the corrugated filter material each comprises a flat area and two side wall areas, the resistance of the corrugated material to crushing is greatly increased. If structural strength is not a critical factor, cylindrical portions 58 and 60 of rollers 40 and 42 may be replaced by other surface portions forming continuous paths corresponding to the highest and lowest points of the roller corrugations. Thus, for example, if structural strength is not required in the finished product, roller 40 of FIGURE 2 may be modified by removal of the end portions defined by the broken lines A—A and B—B. Roller 42 would, of course, be similarly modified.

Although particularly effective filters are made according to the process illustrated in the above description, filter materials other than that described may be formed into filter structures according to the process of the invention. Furthermore, crimped filter sheets and flat spacer sheets may be stacked rather than wound, in a manner similar to that illustrated in FIGURE 2 of the abovementioned Hollenbach patent. Similarly, further variations from the descriptions of the process, apparatus and article described above may be made within the scope of the invention. Accordingly, it is intended that the scope of the invention be limited only by the scope of the appended claims.

I claim:

1. A filter body comprising alternate layers of spacer material and corrugated material, at least one of said materials being porous, said layers of corrugated material having corrugations extending generally parallel to one another and extending at least part of the distance between a first surface of said filter body and a second surface of said filter body, each said layer of corrugated material having in the vicinity of each said surface of said body an indented portion, said indented portion in the vicinity of one said surface projecting in a direction opposite to that of said indented portion in the vicinity of the other said surface, one said indented portion of each said layer of corrugated material adjoining a layer of spacer material on one side of said corrugated material, and the other said indented portion of the same layer of corrugated material adjoining a layer of spacer material on the opposite side of said layer of corrugated material, said indented portions forming barriers in the vicinity of the ends of channels defined by said corrugated material and said spacer material.

2. The method for making a filter body which comprises the steps of forming a sheet of corrugated material having ridges and grooves therein, forming in the vicinity of one edge of said corrugated material a raised portion having a surface corresponding to the maximum heights of said ridges and in the vicinity of an opposed edge of said sheet a lowered portion having a surface corresponding in height to the minimum height of said grooves, forming a body comprising alternate layers of said corrugated material and a generally smooth spacer material with said ridges and grooves of said sheets of corrugated material generally parallel to one another to form with said spacer material a plurality of channels extending between opposed surfaces of said body, at least one of said corrugated material and said spacer material being porous, said raised and lowered portions of said corrugated material forming barriers within said channels.

3. The method according to claim 2 in which the step of forming alternate layers of said corrugated material and said generally smooth spacer material is accomplished by winding alternate layers of said materials and bonding said material to one another.

4. A method for making a filter body which comprises the steps of applying a suspension comprising a pulverized ceramic material and a binder to the surface of a flexible first sheet, corrugating said first sheet to produced ridges and grooves therein, forming in the vicinity of one edge of said first sheet a raised portion having a surface corresponding in height to the maximum heights of said ridges and in the vicinity of an opposed edge of said first sheet a lowered portion having a surface corresponding in height to the minimum height of said grooves, applying a suspension comprising a pulverized ceramic material and a binder to the surface of a second sheet, forming a body comprising alternate layers of said first sheets and said second sheets, and firing said body to sinter said ceramic particles into a unitary porous structure.

5. A filter element useful in the manufacture of filter bodies, which element comprises a corrugated sheet of filter material having generally parallel ridges and grooves, a raised generally smooth surface portion in the vicinity of a first edge of said sheet extending in a direction generally perpendicular to said ridges and grooves and having a height substantially corresponding to the maximum heights of said ridges, and in the vicinity of a second edge of said sheet opposed to said first edge a lowered portion extending in a direction generally parallel to said raised portion and having a generally smooth surface having a height substantially corresponding to the minimum heights of said grooves.

References Cited

UNITED STATES PATENTS 2,502,545 4/1950 Wellborn _____ 210—494
3,112,184 11/1963 Hollenbach _____ 264—59
3,242,649 3/1966 Rivers _____ 210—493

FOREIGN PATENTS 522,265 3/1956 Canada.

REUBEN FRIEDMAN, *Primary Examiner.*

D. M. RIESS, *Assistant Examiner.*